(12) United States Patent
Logan

(10) Patent No.: US 7,468,655 B2
(45) Date of Patent: Dec. 23, 2008

(54) AIRCRAFT TIRE CONDITION MONITORING SYSTEM AND METHOD

(75) Inventor: Brian Matthew Logan, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 245 days.

(21) Appl. No.: 11/467,405

(22) Filed: Aug. 25, 2006

(65) Prior Publication Data

US 2008/0055060 A1    Mar. 6, 2008

(51) Int. Cl.
     *B60C 23/02*      (2006.01)
(52) U.S. Cl. ..................................... 340/442
(58) Field of Classification Search ......... 340/442–448, 340/572.1; 73/146.5, 146
See application file for complete search history.

(56) References Cited

U.S. PATENT DOCUMENTS

| | | | | |
|---|---|---|---|---|
| 4,334,428 A | | 6/1982 | Fima et al. | |
| 4,459,579 A | * | 7/1984 | David et al. | 340/443 |
| 4,550,385 A | * | 10/1985 | Pulk et al. | 702/140 |
| 5,231,391 A | | 7/1993 | Rigaux | |
| 5,491,465 A | | 2/1996 | Adams | |
| 6,255,940 B1 | | 7/2001 | Phelan et al. | |
| 6,591,671 B2 | | 7/2003 | Brown | |
| 6,829,925 B2 | | 12/2004 | Nespo et al. | |
| 6,959,596 B2 | * | 11/2005 | Pradier et al. | 73/146.5 |
| 7,021,132 B2 | * | 4/2006 | Nigon et al. | 73/146.5 |
| 7,089,157 B2 | * | 8/2006 | Locatelli | 702/188 |
| 2005/0066718 A1 | | 3/2005 | Pradier et al. | |

* cited by examiner

*Primary Examiner*—Phung Nguyen
(74) *Attorney, Agent, or Firm*—Wood, Herron & Evan, LLP

(57) ABSTRACT

An aircraft tire condition monitoring system includes a reader mounted in the fuselage of an aircraft and an antenna that defines a peripheral boundary proximate the circumference of a tire of the aircraft. The antenna is electrically coupled to the reader to facilitate the communication of signals from a transponder located within the tire. The antenna may be located within the tire, or it may be located on the aircraft fuselage.

4 Claims, 5 Drawing Sheets

AIRCRAFT TIRE CONDITION MONITORING SYSTEM AND METHOD

TECHNICAL FIELD

The present invention pertains generally to an apparatus for monitoring the condition of a tire, and more particularly to an apparatus for monitoring the condition of a pneumatic aircraft tire.

BACKGROUND

The benefits of proper inflation of aircraft tires are well known. For example, properly inflated aircraft tires protect against tire failure due to extreme deflection of the tires during take-off and landing, and also help to reduce dynamic stresses in the tires to thereby extend the working life of the tires.

It is well known to monitor the condition of a pneumatic tire using one or more sensors disposed within the tire or on a wheel rim upon which the tire is mounted. Conventional tire monitoring systems typically utilize radio frequency (RF) transponders that are provided with sensors for detecting various conditions of a tire, such as the internal pressure and temperature of the tire. The transponders may be active or passive. Active transponders have their own power supply (e.g., a battery), while passive transponders are powered by the energy of an incoming RF signal from a reader device, as known in the art. The transponder generates a signal to be received by the reader device and which includes information related to the sensed conditions of the tire.

Because RF transponders have a relatively limited communication range, reader devices must be located relatively close to the transponders to receive the signals. Conventional instrumented tires have utilized a transponder fixed to an interior surface of the tire, and an antenna which extends circumferentially around the tire to facilitate communication between the transponder and the reader device regardless of the angular orientation of the transponder in the rotating tire relative to the reader device. One drawback of using circumferentially extending antennas mounted within the interiors of pneumatic tires is that cyclic tensile and flexural loading of the tires as they rotate causes stress fractures in the antenna which may degrade performance and/or cause the antennas to break. The problem is compounded in pneumatic tires used in aircraft, which must not only handle heavy loads, but must also accommodate high forces when the tires impact the ground during landing maneuvers.

A need therefore exits for a system to monitor the conditions of aircraft tires that overcomes these and other drawbacks of the prior art.

SUMMARY

The present invention overcomes the foregoing and other shortcomings and drawbacks of tire condition monitoring systems heretofore known for use in vehicles. While the invention will be described in connection with certain embodiments, it will be understood that the invention is not limited to these embodiments. On the contrary, the invention includes all alternatives, modifications and equivalents as may be included within the spirit and scope of the present invention.

According to one aspect of the invention, an aircraft tire condition monitoring system includes a reader mounted in the fuselage of an aircraft for receiving signals from an instrumented aircraft tire, and an antenna that defines a peripheral boundary proximate the circumference of the tire. The antenna is electrically connected to the reader for transmission of electrical signals, either by electromagnetic coupling between two conductors or by direct physical connection therebetween.

The system further includes a tire having a transponder located on the interior of the tire. The transponder is configured to sense are pressure and/or temperature associated with the tire. The transponder generates a signal related to the sensed pressure and/or temperature. The signal is communicated to the reader via the antenna. In one embodiment, the antenna may be located within the interior of the tire. In another embodiment, the antenna is located exteriorly of the tire, such as in the fuselage of the aircraft.

These and other features, objects and advantages of the invention will become more readily apparent to those skilled in the art in view of the following detailed description, taken in conjunction with the accompanying drawings.

BRIEF DESCRIPTION OF THE DRAWINGS

The accompanying drawings, which are incorporated in and constitute a part of this specification, illustrate embodiments of the invention and, together with the general description of the invention given above, and the detailed description given below, serve to explain the principles of the invention.

DETAILED DESCRIPTION

Figure 1:
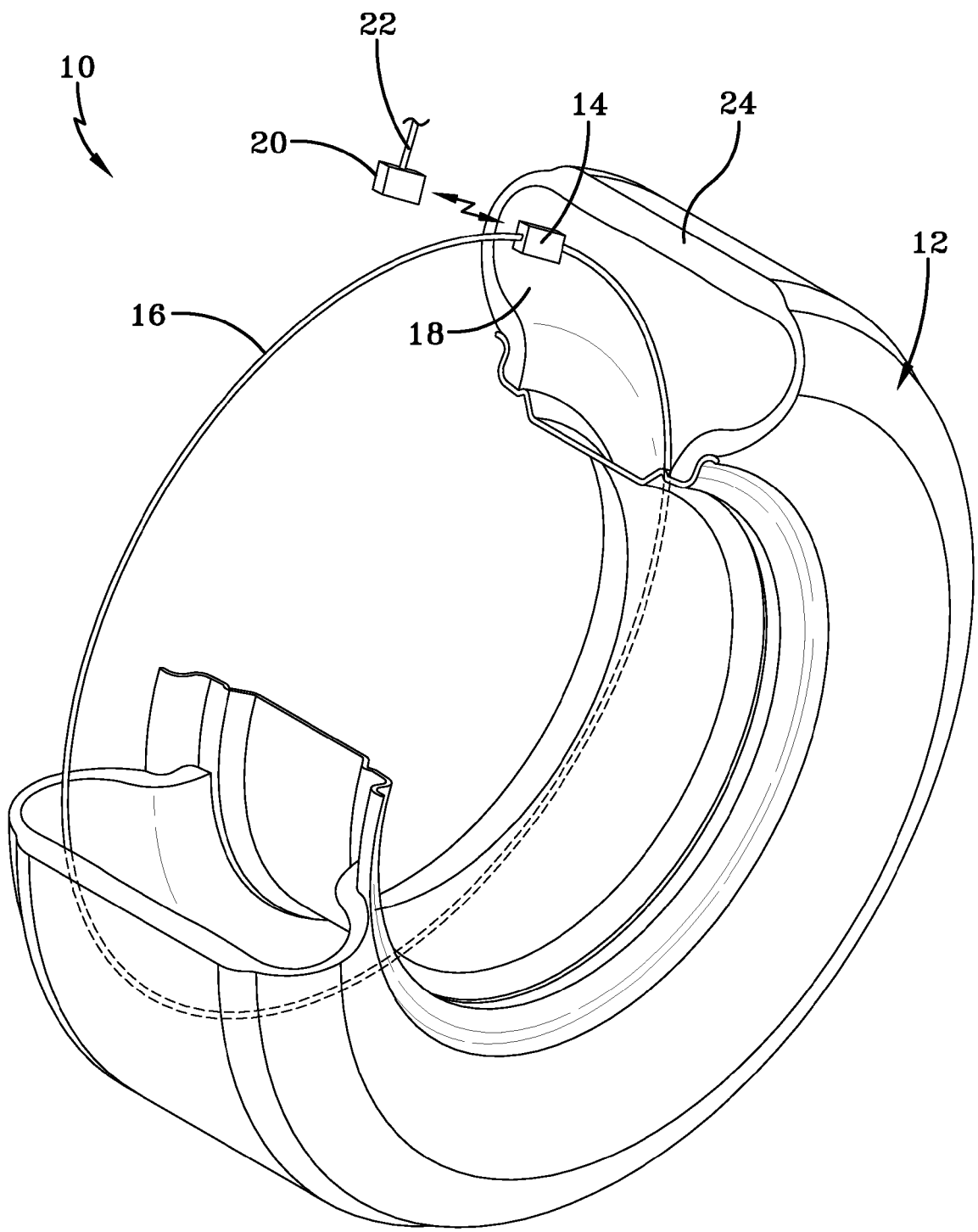
FIG. 1 is a perspective view illustrating an instrumented pneumatic tire in accordance with the principles of the present invention.

FIG. 1 depicts an exemplary aircraft tire condition monitoring system 10 in accordance with the principles of the present invention. The monitoring system 10 includes a pneumatic aircraft tire 12. A transponder 14 and an antenna 16 are mounted to tire sidewall 18 within the interior of the tire 12. The transponder 14 is configured to sense various parameters of the pneumatic tire 12, such as pressure and temperature of the interior of the tire 12. The antenna 16 is electrically connected to the transponder 14 and extends circumferentially around the sidewall 18 of the tire 12. Because the antenna 16 in this embodiment is mounted to the sidewall 18, it should comprise material suited to accommodate the cyclic tensile and flexural stresses experienced during service.

The monitoring system 10 further includes a reader device 20 positioned exteriorly of the tire 12, at a location in an aircraft fuselage. Accordingly, the transponder 14 can communicate with the reader 20 to transmit information related to the sensed conditions of the tire 12. Because the antenna 16 extends circumferentially around the sidewall 18 of the tire 12, communication between the reader 20 and transponder 14 may occur regardless of the angular orientation of the transponder 14 within tire 12, relative to the reader 20. The reader 20 may be configured to record information received from the transponder 14, or to perform calculations or mathematical and/or statistical operations using the information. Reader 20 may also transmit some or all of the information to another device (not shown), such as a display for indicating the conditions of the tire 12 to a user. The transmission of information or other signals from reader 20 may be in the form of radio frequency signals, or signals transmitted by a communication line 22.

While the monitoring system 10 has been described above as being configured to sense pressure and temperature conditions within a tire 12, it will be recognized that various other parameters may be sensed. For example, monitoring systems in accordance with the principles of the invention may sense rotational speed, slip, vertical displacement, or various other parameters related to the condition of the tire and/or operation of the tire or aircraft.

Figure 2:
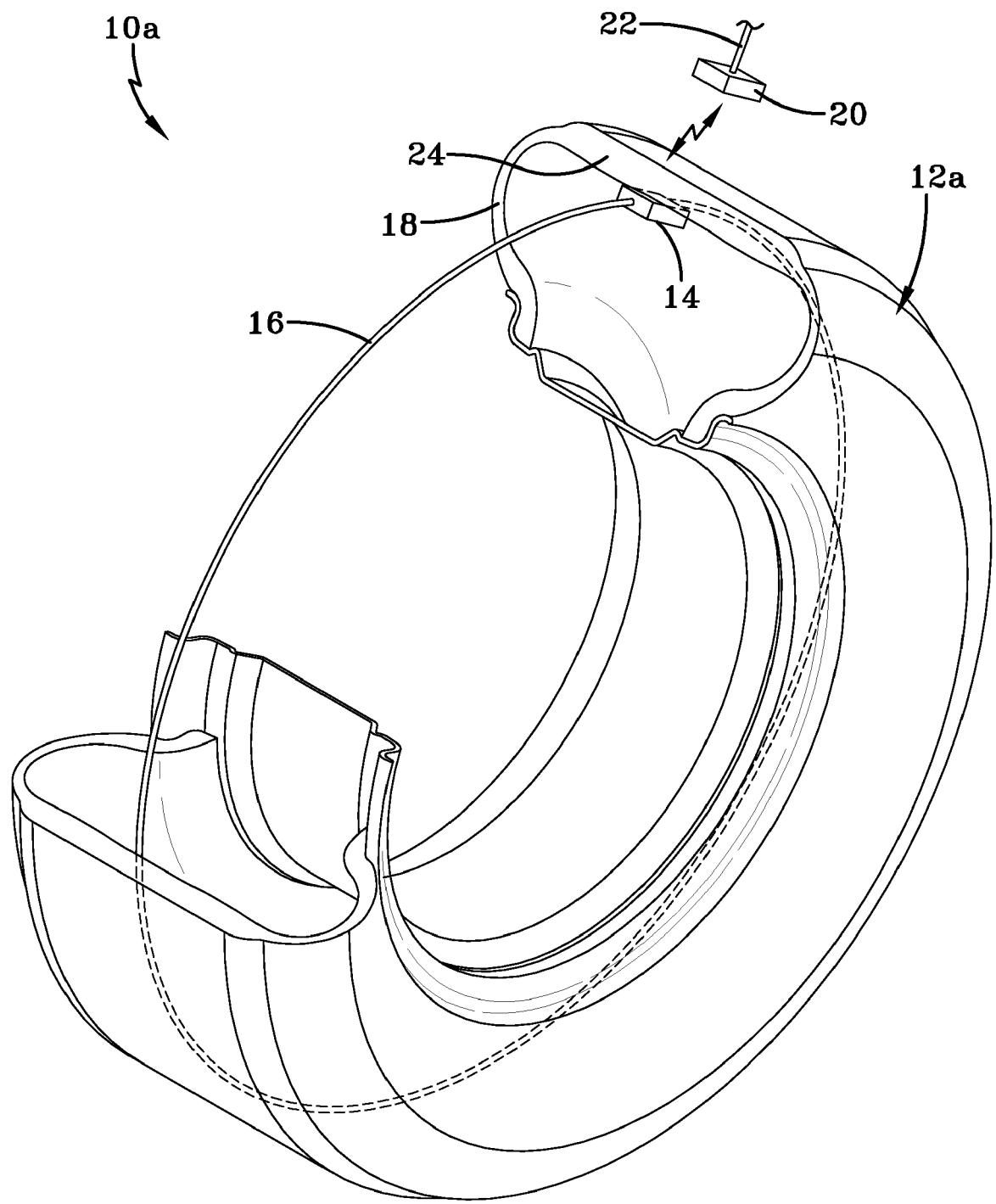
FIG. 2 is a perspective view of a second exemplary instrumented pneumatic tire in accordance with the principles of the present invention.

FIG. 2 depicts another exemplary embodiment of a tire condition monitoring system 10a wherein features similar to those discussed above with respect to FIG. 1 are similarly numbered. A transponder 14 and an antenna 16 are disposed within the interior of an aircraft tire 12a, on an inner surface of a circumferential wall 24 of the tire 12a. The system further includes a reader device 20 positioned outside the tire 12a for communication with the transponder 14. Information regarding the condition of the tire 12a is communicated from the transponder 14 to the reader 20. The reader 20 may store the information for subsequent transmission to another device, or the reader 20 may perform operations or calculations using the information. Thereafter, the information may be communicated to a third device, such as by radio frequency transmission, or by communication line 22, in a manner similar to that described above.

Figure 3:
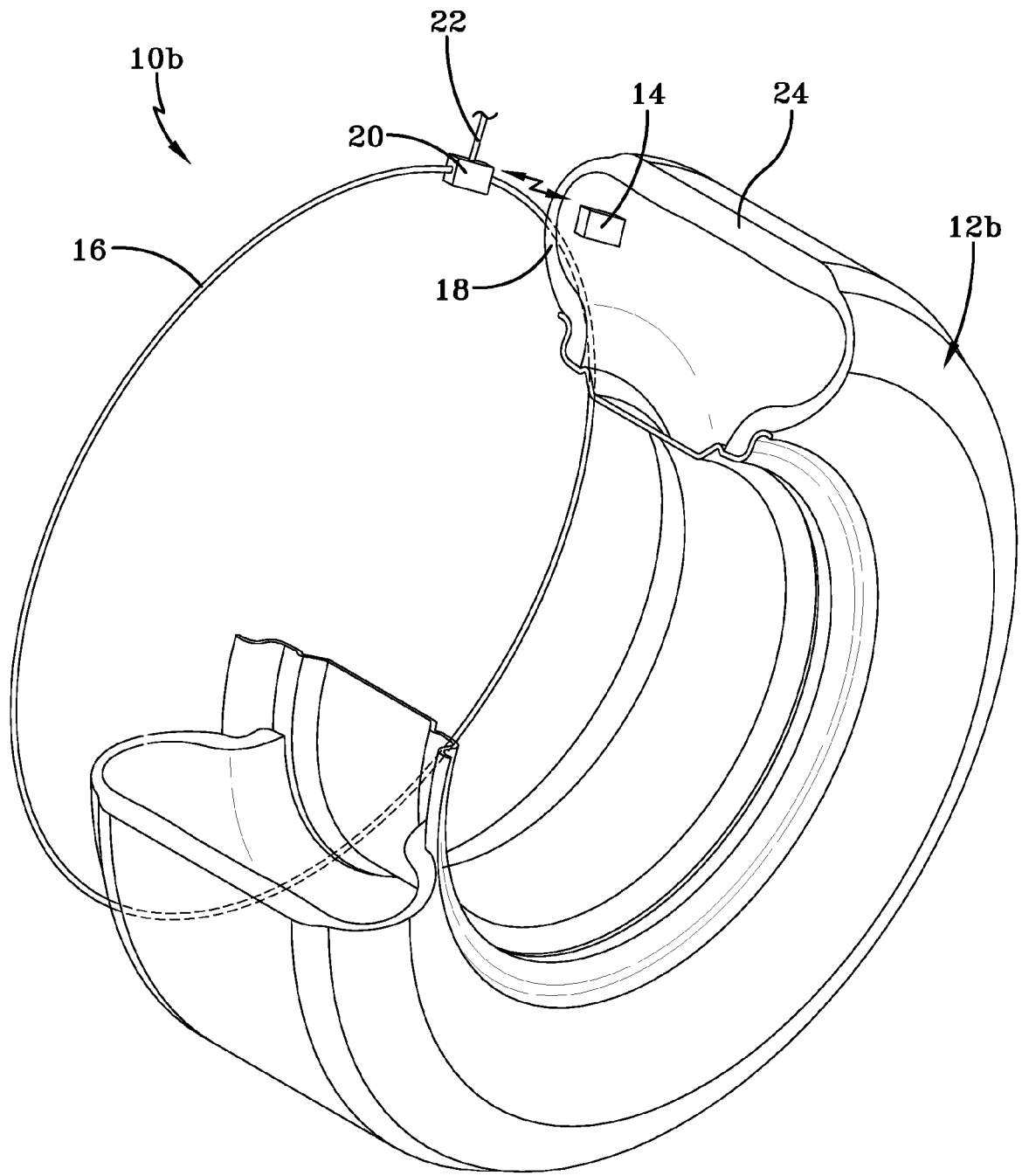
FIG. 3 is a perspective view of a third exemplary instrumented pneumatic tire in accordance with the principles of the present invention.

FIG. 3 illustrates another exemplary embodiment of an aircraft tire condition monitoring system 10b, in accordance with the principles of the present invention. In this embodiment, a transponder 14 is disposed within a pneumatic aircraft tire 12b, on the interior surface of a sidewall 18. The system further includes a reader device 20 located outside the tire, as discussed above with respect to FIGS. 1 and 2. In this embodiment, however, the antenna 16 is also located outside the tire 12b and is operatively electrically connected to the reader device 20. The antenna 16 defines a peripherally extending boundary generally corresponding to a path traced by transponder 14 as tire 12b rotates about its geometric center. Accordingly, communication between the transponder 14 and the reader device 20 is facilitated regardless of the angular orientation of the transponder 14 within tire 12b relative to reader device 20.

Figure 4:
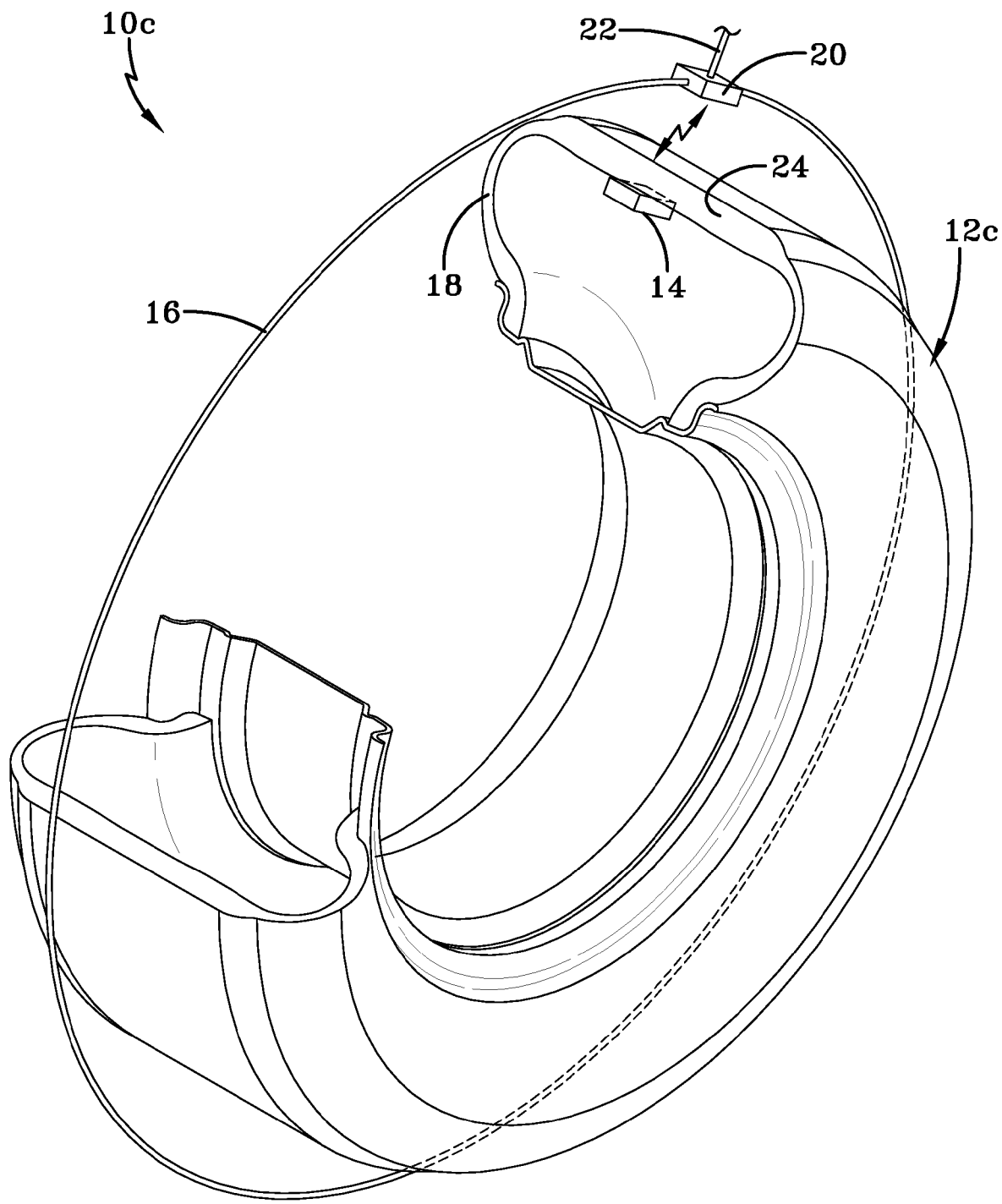
FIG. 4 is a fourth exemplary instrumented pneumatic tire in accordance with the principles of the present invention.

FIG. 4 illustrates yet another exemplary embodiment of an aircraft tire condition monitoring system 12c. In this embodiment, a transponder 14 is located within the interior of a pneumatic aircraft tire 12c, on an interior surface of the circumferential sidewall 24 of the tire 12c. The reader device 20 and an antenna 16 are disposed outside the tire 12c. The antenna 16 extends circumferentially around the outer surface of the tire 12c to define a peripheral boundary which generally corresponds to a path traced by the transponder 14 as the tire 12c rotates about its geometric center. Communication between the transponder 14 and the reader device 20 can occur regardless of the angular orientation of the transponder 14 within the tire 12c, relative to the reader device 20, as discussed above.

While FIGS. 1-4 depict antennas 16 that are physically connected to transponders 14 or readers 20, it will be appreciated that the antennas may alternatively be spaced from the transponders 14 or readers 20 distances suitable for permitting communication of signals between the antennas 16 and the transponders 14 or readers 20, such as by electromagnetic coupling.

Figure 5:
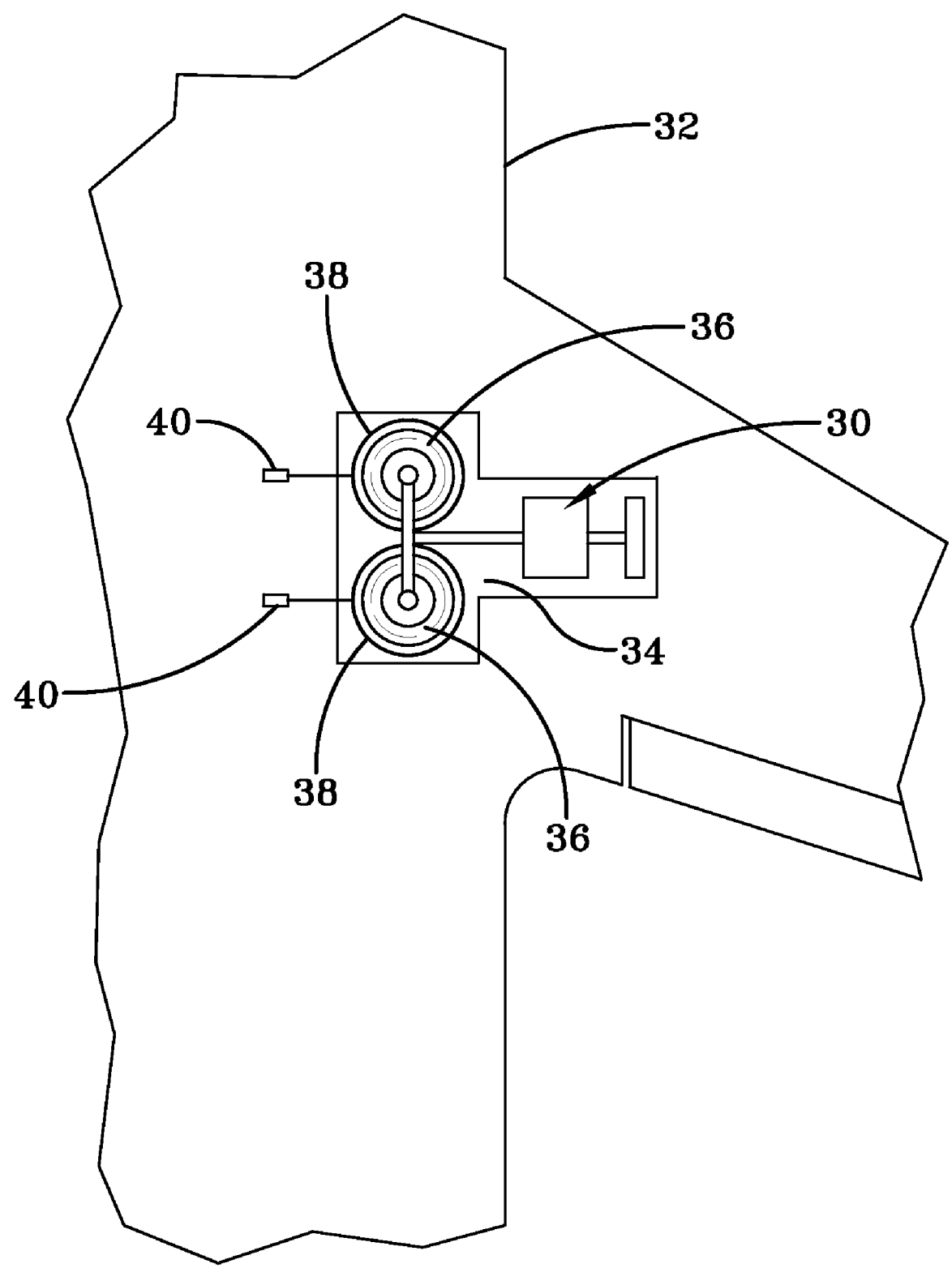
FIG. 5 is a schematic plan view illustrating an exemplary installation of an instrumented pneumatic tire on an aircraft, in accordance with the principles of the present invention.

FIG. 5 depicts an exemplary installation of an aircraft tire condition monitoring system, as described above, used with the landing gear 30 of an aircraft. The landing gear 30 is coupled to the aircraft fuselage 32 and is movable between an extended condition (not shown) for supporting the aircraft during take off and landing, and a retracted position within a landing gear bay 34 in the fuselage 32. The landing gear 30 further includes one or more pneumatic aircraft tires 36 instrumented with a transponder (not shown) as discussed above. In the embodiment shown, the tire condition monitoring system includes antennas 38 mounted outside the tires 36 and defining a peripheral boundary around the tires 36, in a manner similar to that described above with respect to FIGS. 3 and 4. The antennas 38 are coupled to respective reader devices 40 configured to communicate with the transponders to thereby receive information related to the conditions of the respective tires 36.

While FIG. 5 illustrates an aircraft tire condition monitoring system wherein the antennas 38 are disposed outside the tires 36, it will be recognized that antennas may alternatively be provided on the interior surface of the tires as discussed above with respect to FIGS. 1 and 2. The reader devices 40 may perform functions on the information received from the transponders, and may record the information or further transmit the information to other devices so that the information may be recorded or acted upon as appropriate.

An aircraft tire condition monitoring system in accordance with the principles of the present invention, as described above, is capable of monitoring various parameters of an aircraft's tires in service to ensure that the tires are in good condition. Information related to the condition of the tires may be recorded or communicated to users of the system, so that appropriate action can be taken to service or replace tires, as may be required. Information related to sensed conditions of a tire can be communicated from a transponder within a tire to a reader located outside the tire regardless of the angular position of the transponder due to tire rotation.

While the present invention has been illustrated by the description of exemplary embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of the general inventive concept.

What is claimed is:

1. An aircraft tire condition monitoring system, comprising:
   a reader mounted in the fuselage of an aircraft; and
   an antenna defining a peripheral boundary proximate the circumference of a tire of the aircraft landing gear, at least when the tire is in a stowed position, said antenna operatively electrically connected to said reader for the transmission of signals therebetween;
   wherein said antenna is mounted to the fuselage of the aircraft.

2. The aircraft tire condition monitoring system of claim 1, further comprising:
   a tire; and a transponder disposed within said tire, said transponder adapted to sense at least one of a pressure and a temperature of said tire and to communicate information related to the sensed pressure or temperature to said reader via said antenna.

3. A method of monitoring the condition of an aircraft tire, comprising:

sensing an operating parameter associated with the tire;

generating a signal related to the sensed parameter using a transponder mounted within the tire; and transmitting the signal to a reader located on an aircraft fuselage via an antenna located on the aircraft fuselage and defining a peripheral boundary proximate a circumference of the tire, at least when the tire is in a stowed position.

4. The method of claim 3, wherein the sensed operating parameter is at least one of a pressure and a temperature associated with the tire.

* * * * *